United States Patent [19]
Martin

[11] 3,842,198
[45] Oct. 15, 1974

[54] SOUND DEMODULATOR AND AFC SYSTEM

[75] Inventor: James C. Martin, Fort Wayne, Ind.

[73] Assignee: Warwick Electronics Inc., Chicago, Ill.

[22] Filed: Sept. 7, 1973

[21] Appl. No.: 395,286

[52] U.S. Cl. .......... 178/5.8 AF
[51] Int. Cl. .......... H04n 5/50
[58] Field of Search .......... 178/5.8 AF, 5.8 R, 5.8 A, 178/DIG. 19, DIG. 7; 325/423, 487, 346, 349, 416–422; 329/124, 140

[56] References Cited

UNITED STATES PATENTS 3,023,272 2/1962 Baugh .......... 178/5.8
3,040,268 6/1962 Foos .......... 178/DIG. 19

*Primary Examiner*—Richard Murray
*Assistant Examiner*—R. John Godfrey
*Attorney, Agent, or Firm*—Hofgren, Wegner, Allen, Stellman & McCord

[57] ABSTRACT

A television receiver of the split-sound type includes a sound channel with a demodulator for developing both a sound output signal and an AFC signal for controlling a television tuner. The demodulator, which may be manufactured as a linear integrated circuit, includes an FM limiter which passes a clipped 41.25 megahertz sound carrier to a quadrature or coincident detector. The output of the detector is AC coupled to a sound pre-amplifier and to a volume circuit with mute and squelch functions. The detector output is also coupled to an AFC amplifier which has a double-ended output. The limiter and detector have a bandwidth greater than ±1 MHz.

9 Claims, 5 Drawing Figures

SOUND DEMODULATOR AND AFC SYSTEM

BACKGROUND OF THE INVENTION

This invention relates to a television receiver having a single demodulator for developing both sound and AFC signal outputs.

Early television receivers had two intermediate-frequency (IF) amplifier systems, one for video amplification and one for audio amplification. When the composite television signal containing the video carrier and the audio carrier were beat with the local oscillator signal, two IF signals were produced and separately processed by a "split-sound" system.

An automatic frequency control (AFC) voltage was developed from the sound demodulator in the audio channel. For example, Alter U.S. Pat. No. 2,666,847 describes a split-sound system in which the audio discriminator has a bandwidth such as 500 KHz, which is greater than required for audio demodulation of the ± 25 KHz audio carrier, in order to develop an AFC signal. Such a bandwidth requirement, while necessary to produce an AFC signal with sufficient pull-in range, reduces the sensitivity of the audio discriminator and requires an increase in the gain of the audio channel.

To avoid additional stages for increasing gain, early split-sound systems used a dual band pass technique in which the audio discriminator normally had a narrow band pass, which was increased to a wide band pass during channel selection.

The change in band pass could be electrically controlled, as in the above Alter patent, or mechanically controlled in response to movement of the tuner as shown for example in Green U.S. Pat. No. 2,553,368.

Various problems caused the early split-sound system to be abandoned. The bandwidth of the audio discriminator was not sufficiently wide to provide an AFC signal which would not be locked-out by drift. Mechanical vibrations of the speaker and switching vibrations in the receiver caused microphonics. Finally, interstation noise and side response effects were very annoying.

To overcome the above problems and the complexity of the split-sound system, the now standard intercarrier sound system was developed. In a television receiver, the sound signal is derived by beating the picture carrier at 45.75 MHz with the sound carrier at 41.25 MHz to derive an IF signal at 4.5 MHz. The 4.5 MHz signal is demodulated by a separate audio detector to derive the sound information. The AFC signal for controlling the local oscillator is derived in most television receivers from the IF video stage which amplifies the video carrier at 45.75 MHz.

The use of a linear integrated circuit (IC) in the sound channel of an intercarrier TV receiver has been attempted. For example, an FM detector for use at 4.5 MHz and which has included a limiter amplifier and a quadrature detector is type ULX-2111A of Sprague Electric Company. Such an IC is described in Sprague Technical Paper No. TP-67-21, entitled "A Monolithic Limiter and Balanced Discriminator for FM AND TV Receivers", by A. Bilotti and R. S. Pepper, presented at the National Electronics Conference in Chicago, Ill. in October, 1967.

Unfortunately, the intercarrier sound system is not well suited for design of linear integrated circuits. Tuning must be provided at 45.75 MHz for the AFC signal, at 4.5 MHz for the sound channel. It would be desirable to replace such a dual tuning system with a single tuning system in order to simplify the design of an IC audio channel.

SUMMARY OF THE INVENTION

In accordance with the present invention, a television receiver of the split-sound type uses a linear integrated circuit and additional circuits to overcome the disadvantages of prior systems as described above. The necessity for AFC tuning at 45.75 MHz and sound tuning at 4.5 MHz has been eliminated and replaced with a single tuning system at 41.25 MHz. The problems with early split-sound systems, such as sound microphoning, AFC lock-out due to drift, and potentially noisy sound during channel changes have been eliminated.

The above advantages are provided by a linear integrated circuit which includes in the audio IF channel a limiter amplifier which feeds a quadrature detector to develop both an AFC signal and a sound signal. A sound preamplifier, coupled to the quadrature detector, includes a muting circuit to prevent audible clicks in the audio output during channel changes. The bandwidth of the detector is greater than ± 1 MHz, and preferably is on the order of ± 2 MHz, preventing AFC lock-out even when the receiver is tuned to the UHF channels. Sufficient gain is provided to provide a satisfactory audio output.

One object of the present invention is the provision of a television receiver in which a wide band AFC signal and an audio output signal are developed from an IF audio channel.

Other advantages and features of the invention will be apparent from the following description and from the drawings. While an illustrated embodiment of the invention is shown in the drawings and will be described in detail herein, it should be understood that the present disclosure is to be considered as an exemplification of the principles of the invention and is not intended to limit the invention to the embodiment illustrated.

DESCRIPTION OF THE PREFERRED EMBODIMENT

Figures 1, 2, 3:
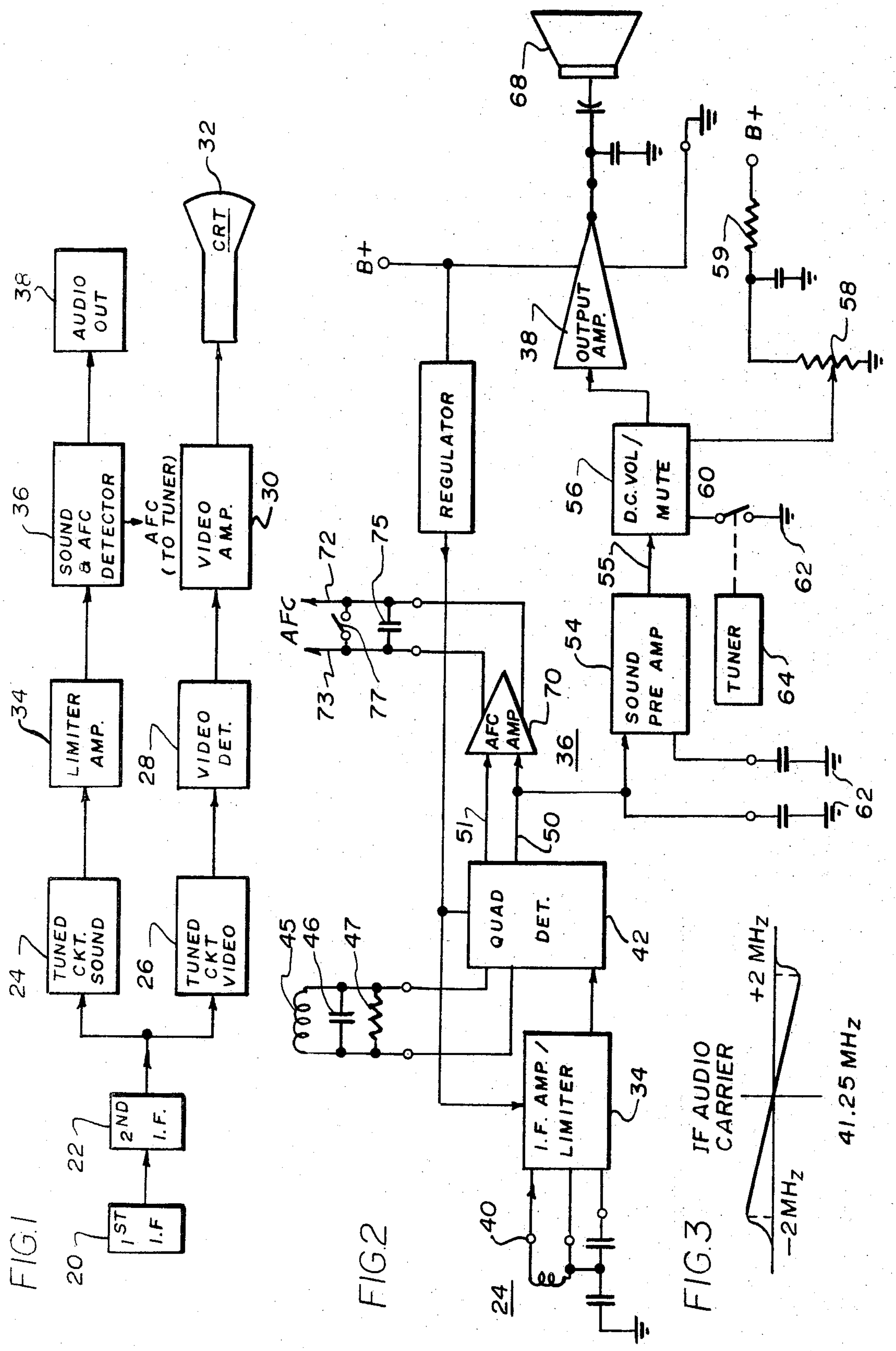
FIG. 1 is a block diagram of a split-sound system for a television receiver.
FIG. 2 is a partly block and partly schematic diagram of a novel limiter amplifier and sound and AFC detector for a split-sound TV receiver of the type shown in FIG. 1.
FIG. 3 is a responsive curve which illustrates the bandwidth of the audio channel of FIG. 2.

Turning to FIG. 1, a portion of a television receiver is illustrated which includes a split-sound system. A first IF amplifier 20 and a second IF amplifier 22 amplify a composite IF signal before being coupled to a tuned circuit 24 for the sound channel and a tuned circuit 26 for the video channel. The separated IF video signal is demodulated by a video detector 28 and amplified by a video amplifier 30 before driving a television cathode ray tube or CRT 32.

Tuned circuit 24 in the sound channel passes a wideband signal desirably centered around a sound carrier center frequency of 41.25 MHz, to a linear integrated circuit which includes a limiter amplifier 34 and a combined sound and AFC detector 36. The sound output from detector 36 is coupled to a audio output channel 38 for audio reproduction. The AFC output is coupled to the local oscillator (not illustrated) in the television tuner to provide a conventional automatic frequency control or AFC. Unlike the intercarrier sound system, the sound signal is detected directly from the IF sound carrier at 41.25 MHz, by means of a detector 36 which also directly derives the AFC signal.

In FIG. 2, the limiter/amplifier 34 and sound and AFC detector 36 are illustrated in intermediate detail. The IF audio signal from an input terminal 40 is coupled to the IF limiter 34 which clips the signal to eliminate any amplitude modulation and also provides IF amplification since the IF amplifiers 20 and 22 of FIG. 1 include only two rather than four stages. The limited FM signal, which essentially is a square wave, is coupled to a quadrature or coincident detector 42 which forms a part of the sound and AFC detector 36. The quadrature detector uses a single parallel tuned circuit, consisting of an inductor 45, a capacitor 46 and a resistor 47, tuned to 45.25 MHz in order to provide a fixed frequency reference or standard for comparison with the frequency modulated carrier from limiter 34. The detector 42 provides on a pair of output leads 50 and 51 an audio varying signal which has a DC level corresponding to the deviation of the actual center carrier frequency from the desired center of 41.25 MHz.

A sound preamplifier 54 amplifies the audio varying signal which is then coupled over an output line 55 to a volume control/mute circuit 56. A volume control potentiometer 58 is coupled through resistor 59 to a source of DC potential of B+. The circuit 56 also includes a mute circuit activated under control of a switch 60 which, when closed, passes the audio signal to a source of reference potential or ground 62. Switch 60 is actuated by electrical or mechanical means whenever the television tuner 64 is enabled by a viewer in order to select a different television channel. The mute circuit prevents audible and annoying clicks which otherwise would be produced in the audio output if the television channel were changed. The circuit 56 may also include an adjustable level squelch circuit to eliminate problems caused by microphonics, interstation noise, and side response effects. The audio output from circuit 56 is fed through output amplifier 38 for coupling to a conventional audio loudspeaker 68.

Quadrature detector 42 is also coupled to an AFC amplifier 70 which is responsive to the DC level to detect any frequency deviation which should be corrected. When the FM carrier at input terminal 40 varies about a center frequency other than 41.25 MHz, a differential change in voltage is generated on a pair of AFC output lines 72 and 73. That is, the double-ended output lines 72 and 73 have equal voltages when the IF audio carrier varies equally above and below 41.25 MHz. A center frequency deviation in one direction causes line 72 to be more positive than line 73, and conversely a center frequency deviation in the other direction causes line 73 to go more positive than line 72. An AFC capacitor 75 is located across the parallel output lines, and is shunted by an AFC defeat switch 77. While the AFC amplifier 70 may provide a single ended output, a double ended output is preferred so that drift and level changes do not change the AFC output signal.

To prevent lock-out of the AFC signal, the bandwidth of the audio channel must be sufficiently wide so that any normal deviation in the center carrier frequency, caused by mistuning or drift in the tuner, does not cause the IF audio signal to move out of the range of the audio channel. The bandwidth of the limiter 34 and the detector 42, as well as the AFC amplifier 70, is at least ± 1 MHz, and preferably is ± 2 MHz, as illustrated in FIG. 3. Since such a broad bandwidth reduces the gain of the audio channel, amplifier 54 provides an additional stage of sound preamplification. Although the curve illustrated in FIG. 3 shows a bandwidth of ± 2 MHz, it will be appreciated that the actual bandwidth of the audio channel will typically be less, as from −2 MHz to +1.2 MHz, due to the trap circuit.

Figure 4A:
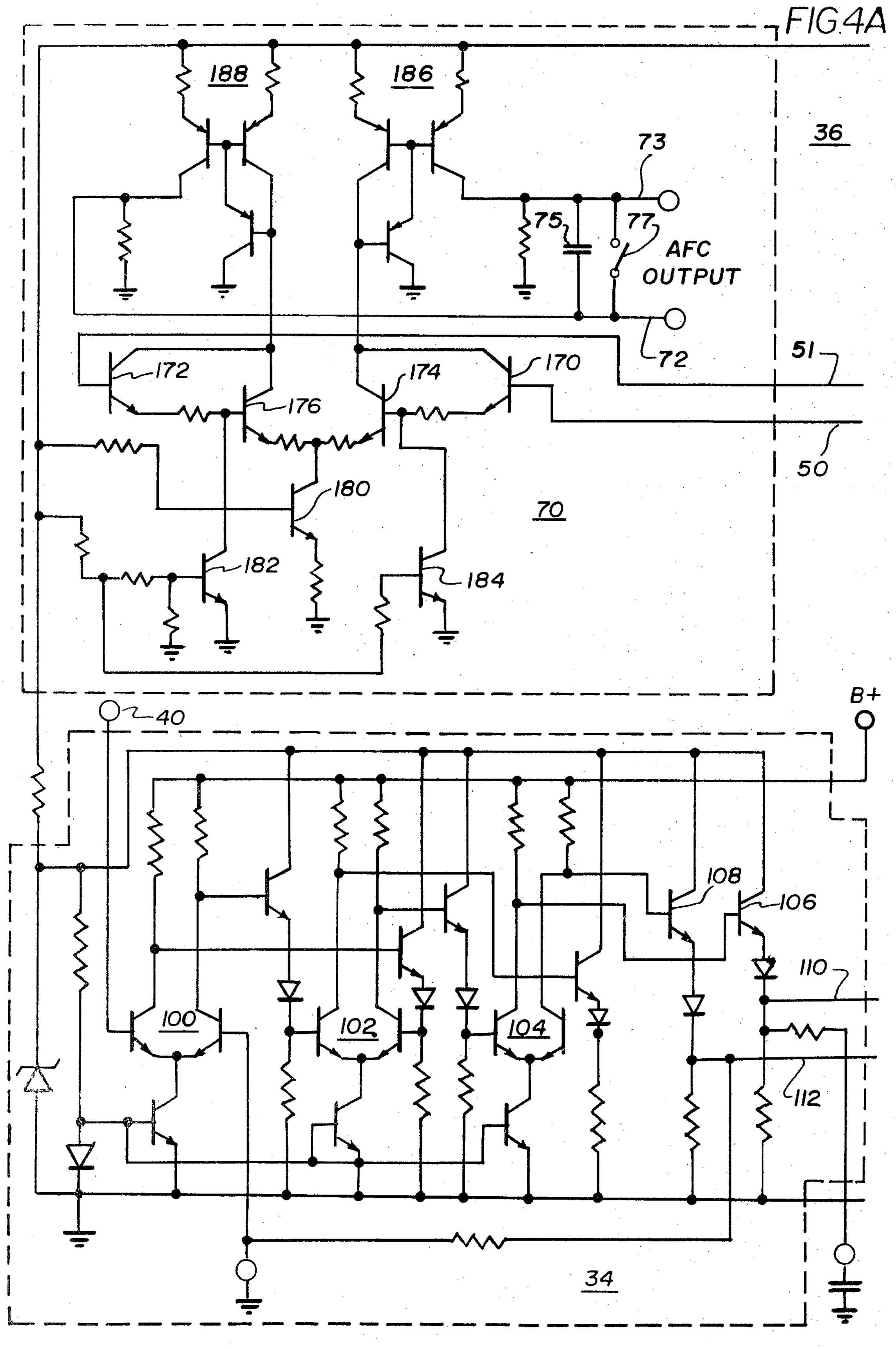
FIGS. 4A and 4B are a single schematic diagram of the IF amplifier/limiter and quadrature detector, AFC amplifier, and sound pre-amplifier of FIG. 2 as incorporated in a single linear integrated circuit.
Figure 4B:
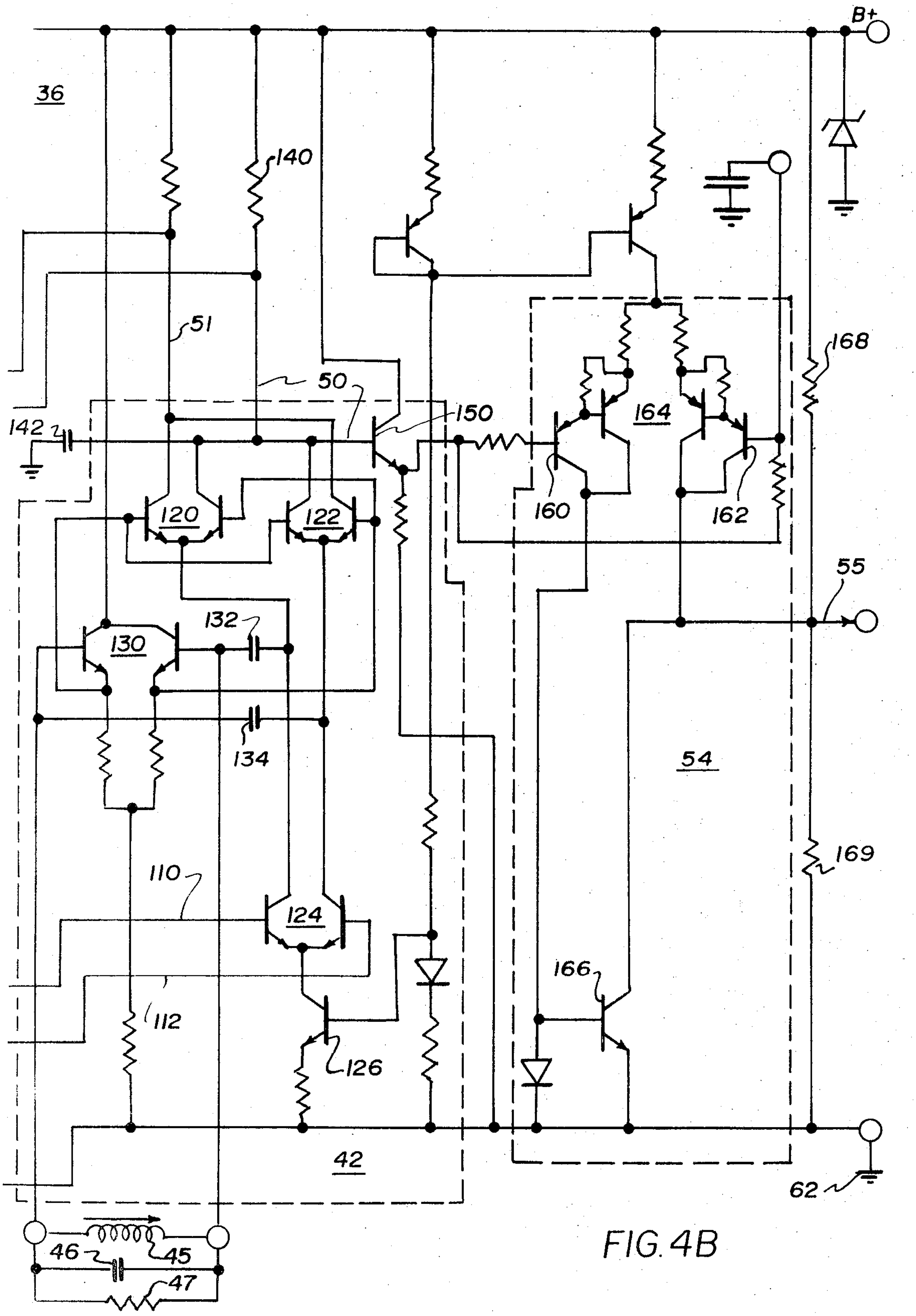

Many of the circuits of FIG. 2 may be incorporated in a single linear integrated circuit (IC) chip. An exemplary IC chip which incorporates the IF amplifier/limiter 34, quadrature detector 42, sound pre-amplifier 54 and the AFC amplifier 70 is illustrated in FIGS. 4A and 4B. The right-hand edge of FIG. 4A should be placed adjacent to the left-hand edge of FIG. 4B in order to form a single schematic. The exact design of many of the circuits in the IC is not a part of the present invention and may take a variety of forms. By way of example, many circuits on the IC chip have the form disclosed in the before identified Sprague Technical Paper No. TC-67-21, to which reference should be made for a more complete description of the operation of the same. Other conventional designs can be substituted for the illustrated circuits, if desired.

Turning to FIG. 4A, the audio IF amplifier/limiter 34 consists of three stages of differential transistor pairs 100, 102 and 104. The stages are directly coupled and are stabilized by a negative feedback loop. The pair of outputs from the differential transistor pair 104 drive a pair of transistor amplifiers 106 and 108 with a pair of opposite going, symmetrical waveforms. Both the top and bottom of the waveform are symmetrically clipped to form a pair of square wave input waveforms for the quadrature detector 42.

The quadrature detector 42, FIG. 4B, consists of two differential transistor pairs 120 and 122 operating as a coincidence detector. The differential pairs 120 and 122 are respectively driven by differential transistor pair 124 which is directly connected to the square wave limited output lines 110 and 112. A constant current source transistor 126 feeds the emitters of the differential pair 124. In operation, the square wave signals alternately drive the two sides of the differential pair 124 into saturation and non-conduction, causing switching currents to flow to the coincident detector differential pairs 120 and 122.

The other pair of inputs to the quadrature detector consists of a sine wave signal coupled to the base of the differential transistor pair 120 and 122. The sine signal is maintained at 41.25 MHz by a differential transistor pair 130 which have bases directly coupled to the parallel tuned circuit 45, 46 and 47. The bases are also coupled through a pair of 90° phase shift capacitors 132 and 134 to the square waves from the differential pair 124. Thus the amplitude limited FM signals on lines 110 and 112 are phase-shifted by 90° and are used to drive the parallel tuned circuit in order to develop the standard or reference signal at 41.25 MHz.

The differential pairs 120 and 122 of the coincidence detector operate as described in the above identified Sprague Electrical Paper No. PP-6-21, to which reference should be made. Briefly, a current pulse flowing in one side of the differential pair 120 occurs only when one of the switching voltages on lines 110 and 112 is positive and one of the sine wave voltages at the corresponding base of the differential pair is 120 negative. The width of the current pulse is directly proportional to the phase difference between the inputs. Since the phase of the frequency varying signals on lines 110 and 112 effectively shifts with audio modulation, the width of the current pulse is a measure of the frequency deviation or difference. The collectors of differential pairs 120 and 122, which are connected to line 50, are coupled to an integrating circuit consisting of a resistor 140 and an externally located capacitor 142 which also provides the required de-emphasis.

The width of the current pulses which are integrated by the network 140, 142 provides an average voltage proportional to the phase and hence the frequency difference between the input signals. The AC signal on lines 50 and 51 corresponds to the audio information component. The DC level of the AC signal corresponds to the IF center frequency, which desirably should be at 41.25 MHz. To the extent that this level varies about a different level, the AFC amplifier 70 unbalances the voltages on output lines 72 and 73.

The sound pre-amplifier 54 is also illustrated in FIG. 4B. An amplitude varying audio signal from transistor 150 drives transistors 160 and 162 which form a differential pair directly coupled to a second differential pair 164. The output of one differential pair is coupled directly to a current source transistor 166, and to the audio output line 55. A pair of resistors 168 and 169 form a voltage divider between B+ and ground 62, for providing bias to the pre-amplifier.

Returning to FIG. 4A, the AFC amplifier 70 includes a differential pair of transistors 170 and 172 which are fed by the input lines 50 and 51. Transistors 170 and 172 in turn drive transistors 174 and 176, respectively connected as a differential pair coupled to a current source transistor 180. A pair of transistors 182 and 184 set the bias for transistors 174 and 176 and hence the gain of the AFC stage. The collectors are coupled to symmetrical stages 186 and 188 to thereby develop on lines 72 and 73 a pair of voltages of equal value when the average voltages on lines 50 and 51 vary with respect to the DC level produced when the frequency deviation varies about 41.25 MHz. As the frequency deviation changes above or below this value, the voltages on lines 72 and 73 change in a differential manner. If desired, additional stages shown in FIG. 2 can be included on the IC chip. Other changes can be made within the scope of the invention.

The embodiments of the invention in which an exclusive property or privilege is claimed are defined as follows:

1. In a television receiver having an IF audio channel for processing an IF audio signal which is frequency modulated above and below a desired IF audio carrier center frequency the improvement comprising:

detector means responsive to said IF audio signal for deriving a wideband AFC signal and an audio output signal, input means for coupling said IF audio signal to said detector means, said detector means and said input means having a bandwidth extending at least 1 MHz above and 1 MHz below said desired IF audio carrier center frequency.

an AFC amplifier having a bandwidth extending at least 1 MHz above and 1 MHz below said desired IF audio carrier center frequency and coupled to said detector means for amplifying the wideband AFC signal, and an audio amplifier coupled to said detector means for amplifying the audio output signal.

2. The improvement of claim 1 wherein said audio amplifier includes a mute circuit responsive to a predetermined condition for disabling the audio output.

3. The improvement of claim 2 wherein the television receiver includes a tuner which can be activated to select different channels, said mute circuit includes switch means effective when enabled to disable the audio output signal, and said switch means being enabled by said tuner when activated to select different channels, whereby a channel change corresponds to said predetermined condition.

4. The improvement of claim 1 wherein the AFC amplifier includes a double-ended output amplifier for developing on a pair of output lines a pair of differentially varying AFC signals.

5. The improvement of claim 4 wherein said AFC amplifier includes a capacitor coupled across the pair of output lines, and an AFC defeat switch coupled in shunt with said capacitor for effectively disabling the AFC output lines.

6. The improvement of claim 1 wherein said detector means comprises a quadrature detector having an output coupled to both the audio amplifier and the AFC amplifier.

7. The improvement of claim 1 wherein said input means comprises a limiting amplifier for symmetrically clipping the IF audio signal.

8. The improvement of claim 7 wherein at least said limiting amplifier and said detector means are formed by a linear integrated circuit.

9. The improvement of claim 1 wherein said input means and said detector means have a bandwidth on the order of ± 2 MHz with respect to the desired IF audio carrier center frequency of 41.25 MHz.

* * * * *